US006609161B1

(12) United States Patent
Young

(10) Patent No.: US 6,609,161 B1
(45) Date of Patent: Aug. 19, 2003

(54) TWO-DIMENSIONAL EXECUTION QUEUE FOR HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 394 days.

(21) Appl. No.: 09/587,538

(22) Filed: Jun. 1, 2000

(51) Int. Cl.[7] .............................................. G06F 3/00
(52) U.S. Cl. ........................... 710/5; 710/36; 710/112; 712/245; 711/128
(58) Field of Search ............................. 710/5, 24, 39, 710/53, 100, 112, 36, 38, 22, 31; 712/225, 245; 711/147, 128, 170

(56) References Cited

U.S. PATENT DOCUMENTS

| 5,564,023 A | * | 10/1996 | Young ........................ 710/100 |
| 5,625,800 A | * | 4/1997 | Brayton et al. ............. 395/500 |
| 5,627,745 A | * | 5/1997 | Flood ............................ 700/2 |
| 5,797,034 A | * | 8/1998 | Young ........................ 710/24 |
| 5,938,747 A | * | 8/1999 | Young ........................ 710/53 |
| 6,006,292 A | * | 12/1999 | Young ........................ 710/39 |
| 6,049,526 A | * | 4/2000 | Radhkrishnan et al. ..... 370/229 |

* cited by examiner

Primary Examiner—Jeffrey Gaffin
Assistant Examiner—Rijue Mai

(74) Attorney, Agent, or Firm—Gunnison, McKay & Hodgson, L.L.P.; Forrest Gunnison

(57) ABSTRACT

A two-dimensional hardware control block execution queue facilitates multiple command delivery to a single target device over an I/O bus, such as a SCSI bus. The two-dimensional hardware control block execution queue includes a plurality of target queues where each target queue includes at least one hardware control block. Each of target queues is a queue of hardware command blocks, e.g., SCSI control blocks (SCBs) for a specific target device on the I/O bus. There is only one target queue for each target device. One head hardware control block, and only one head hardware control block of each target queue, is included in a common queue. When a selection is made by a host adapter for a target device based upon a hardware control block addressed by a head pointer to the common queue, all hardware control blocks in the target queue within the two-dimensional hardware control block queue, which are accepted by the target device, are transferred to the target device. If there are more hardware control blocks in the target queue than are accepted by the target device, the target queue is moved to the end of two-dimensional queue, and a common queue tail pointer is changed to address the first hardware control block in the moved target queue, and the common queue head pointer is moved to address the first hardware control block in the next target queue with the head hardware control block in the common queue.

14 Claims, 7 Drawing Sheets

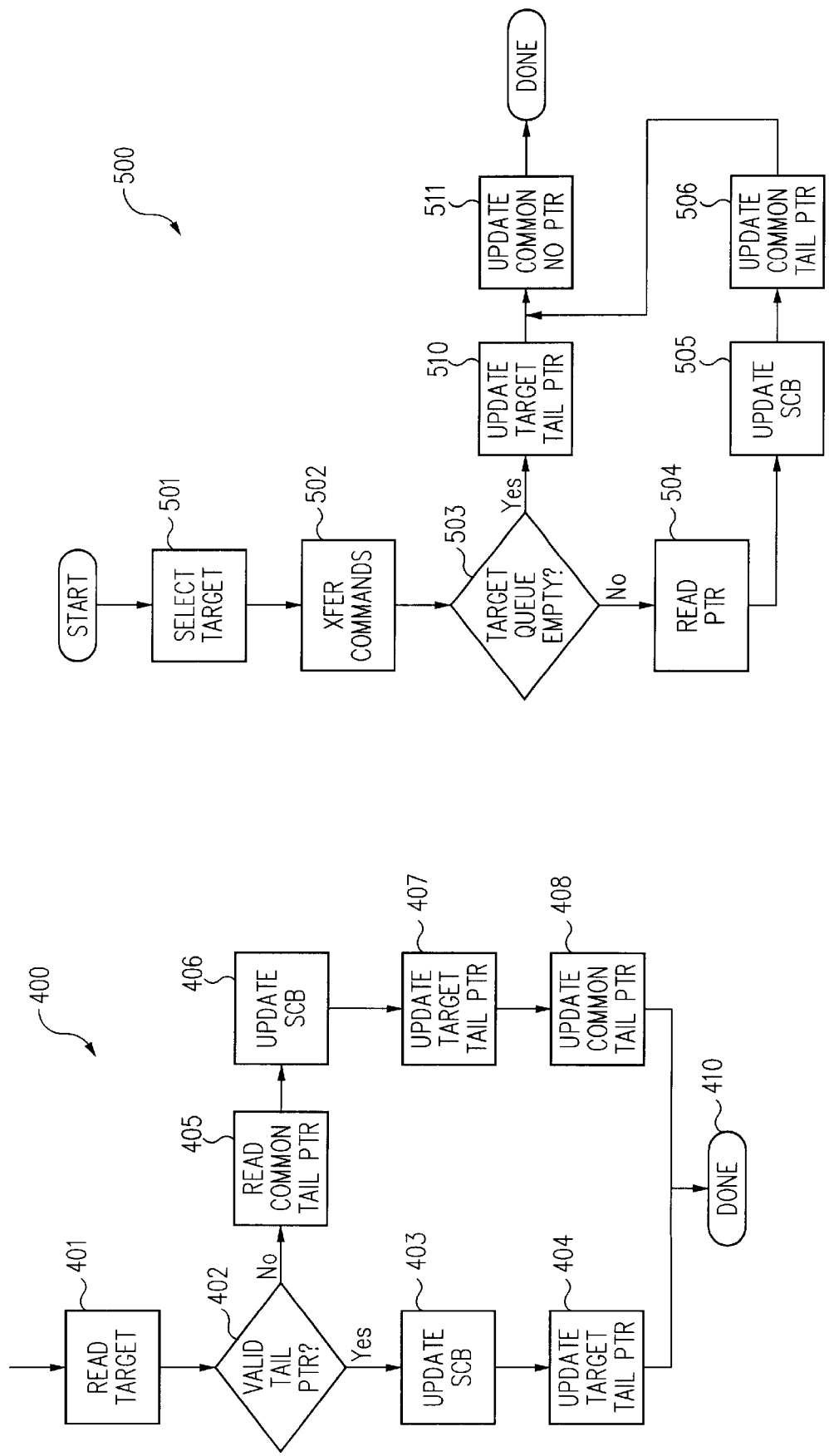

TWO-DIMENSIONAL EXECUTION QUEUE FOR HOST ADAPTERS

BACKGROUND OF THE INVENTION

1. Field of the Invention

The present invention relates generally to host adapters that interface two I/O buses, and more particularly, execution queues for host adapters.

2. Description of Related Art

Hardware control blocks, sometimes called sequencer control blocks or SCSI command blocks (SCBs), are typically used for transferring information between a software host adapter device driver in a host computer and a host adapter integrated circuit that controls operations of one or more peripheral devices. Methods for queuing SCBs are known to those of skill in the art.

For example, see copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated wherein by reference in its entirety. See also, commonly assigned U.S. Pat. No. 5,625,800 entitled "A Sequencer Control Block Array External To A Host Adapter Integrated Circuit" of Michael D. Brayton et al. filed on Jun. 30, 1994; and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

A prior art method for queuing SCBs for a system 100, which included a processor 105 of a host system 106 and a host adapter device 120 with a sequencer 125, used a one-dimensional linked list SCB queue 160 within a SCB array 155 in random access memory 150. A device driver executing on microprocessor 105 managed host adapter 120 using SCBs, e.g., hardware control blocks, in SCB queue 160. Each SCB in SCB queue 160 had a next queue site field Q_NEXT, sometimes referred to as field Q_NEXT, that was used to store a SCB site pointer that addressed the next SCB storage site in SCB queue 160.

Queue 160 was delimited by head pointer 141 and tail pointer 142. Head pointer 141 was the number of the site in SCB array 155 storing the SCB to be executed next, and tail pointer 142 was the number of the site in SCB array 155 containing the last SCB transferred from host system 106. Next queue site field Q_NEXT in the site addressed by tail pointer 142 had an invalid value that was used to identify the SCB as the last in queue 160 in addition to tail pointer 142.

When queue 160 was empty, head pointer 141 was an invalid value. When a new SCB was transferred from host system 106 to SCB array 155, head pointer 141 and tail pointer 142 were changed to point to the storage site of the new SCB, i.e., were changed to valid values. Field Q_NEXT in the new SCB was set to an invalid value to indicate that the SCB was the last SCB in queue 160.

As each new SCB was transferred from host system 106 to SCB array 155, tail pointer 142 was used to identify the end of queue 160. Field Q_NEXT in the SCB pointed to by tail pointer 142 was changed to point to the newly transferred SCB, and then tail pointer 142 was changed to point to the storage site of the newly transferred SCB.

A valid head pointer 141 indicated that one or more commands were available for transfer to one or more SCSI targets. The next target selected was specified by information within the SCB addressed by head pointer 141. Host adapter 120 removed the SCB at the head of queue 160 for execution and selected the specified target. Head pointer 141 was changed to point to the next SCB in queue 160, i.e., the value in field Q_NEXT of the SCB removed for execution was copied to head pointer 141. When the selection process was complete, the command contained within the SCB was transferred to the target.

SCBs in array 160 were executed and targets were selected in the order that the SCBs were received from host system 106. This order is shown by the dashed line in FIG. 1. SCBs were not inserted or removed from the middle of queue 160.

Other methods are known for queuing SCSI command blocks for a SCSI target. See for example, U.S. Pat. Nos. 5,938,747 and 6,006,292, each of which is incorporated herein by reference. Independent of the method used to manage SCBs in a queue within the SCB array, SCBs are executed and targets are selected in the order that the SCBs were received from host system 106. SCBs are not inserted into or removed from the middle of the queue within the SCB array.

SUMMARY OF THE INVENTION

According to the principles of this invention, a command block execution queue stored in a memory includes a plurality of command blocks in a first linked list, sometimes called a common queue of command blocks. The first linked list is delimited by a head pointer and a tail pointer.

The command block execution queue further includes another plurality of command blocks in a second linked list. There is a specific relationship between the first and second linked lists. Specifically, one and only one of the another plurality of command blocks is included in the plurality of command blocks in the first linked list. The second linked list is delimited by only a tail pointer.

In another embodiment, the command block execution queue includes a common linked list of command blocks having a common head command block and a common tail command block. A head pointer addresses the common head command block, while a tail pointer addresses the common tail command block. The command block execution queue also includes a target linked list of command blocks having a target head command block and a target tail command block wherein only the target head command block is included in the common linked list of command blocks. Only a target tail pointer to the target tail command block delimits the target linked list.

In this embodiment, each command block includes a command for a target device, and the common linked list contains a maximum of one command block for a target. Also, in this embodiment, the target linked list contains only command blocks for a single target device.

The command block execution queue in a further embodiment includes another target linked list of command blocks having another target head command block and another target tail command block where one and only one of the another target head command blocks is included in the common linked list of command blocks, and where another target tail pointer addresses the another target tail command block. The target tail pointer and the another target tail pointer are included in a list of target tail pointers. Each command block includes a command for a target device having an identification number. The target linked list contains only command blocks for a single target device having a first identification number, and the another target linked list contains only command blocks for another single target device having a second identification number. The target tail pointer to the target tail command block is stored in the list of target tail pointers at a location determined by the first identification number. The another target tail pointer is stored in the list of target tail pointers at a location determined by the second identification number.

A method of managing a command block execution queue where each command block is associated with one of a plurality of target devices includes testing a predefined location in a list of target tail pointers to determine whether a target queue exists for a target device specified in a hardware command block. The method further includes appending the hardware command block to a tail of the target queue for the target device upon the testing indicating that the target queue exists, and appending the hardware command block to a tail of a common queue upon the testing indicating that the target queue does not exist.

In another embodiment, the method of managing a command block execution queue where each command block is associated with one of a plurality of target devices includes:

appending a new command block to a common tail command block of a common linked list of command blocks when the new command block is associated with a target device different from the target devices associated with the command blocks included in the common linked list of command blocks; and appending the new command block to a target tail command block of a target linked list of command blocks when the new command block is associated with a target device which is a same target device as that associated with one of the command blocks included in the common linked list of command blocks wherein only one target command block of the target linked list is included in the common linked list of command blocks.

BRIEF DESCRIPTION OF THE DRAWINGS

FIG. 4 is a process flow diagram of one embodiment of a method for appending hardware command blocks to the two-dimensional hardware command block queue of FIGS. 3A and 3B.

FIG. 5 is a process flow diagram of one embodiment of a method for managing removal of hardware command blocks from the two-dimensional hardware command block queue of FIGS. 3A and 3B.

In the following description, elements with the same reference numeral are the same or equivalent elements.

DETAILED DESCRIPTION

Figure 1:
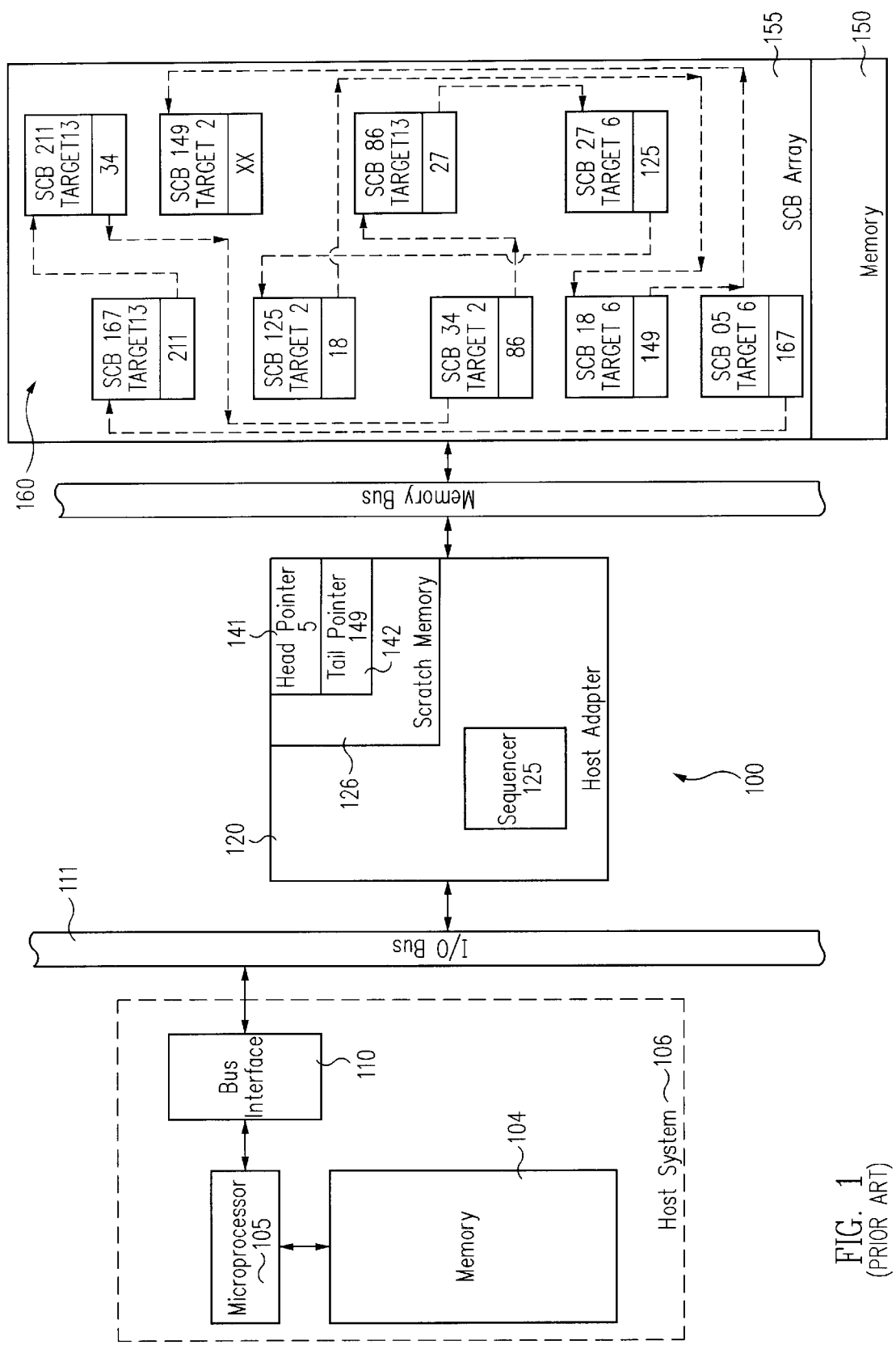
FIG. 1 is a block diagram of a prior art system that includes a linked-list, i.e., one-dimensional, SCB queue.
Figure 2:
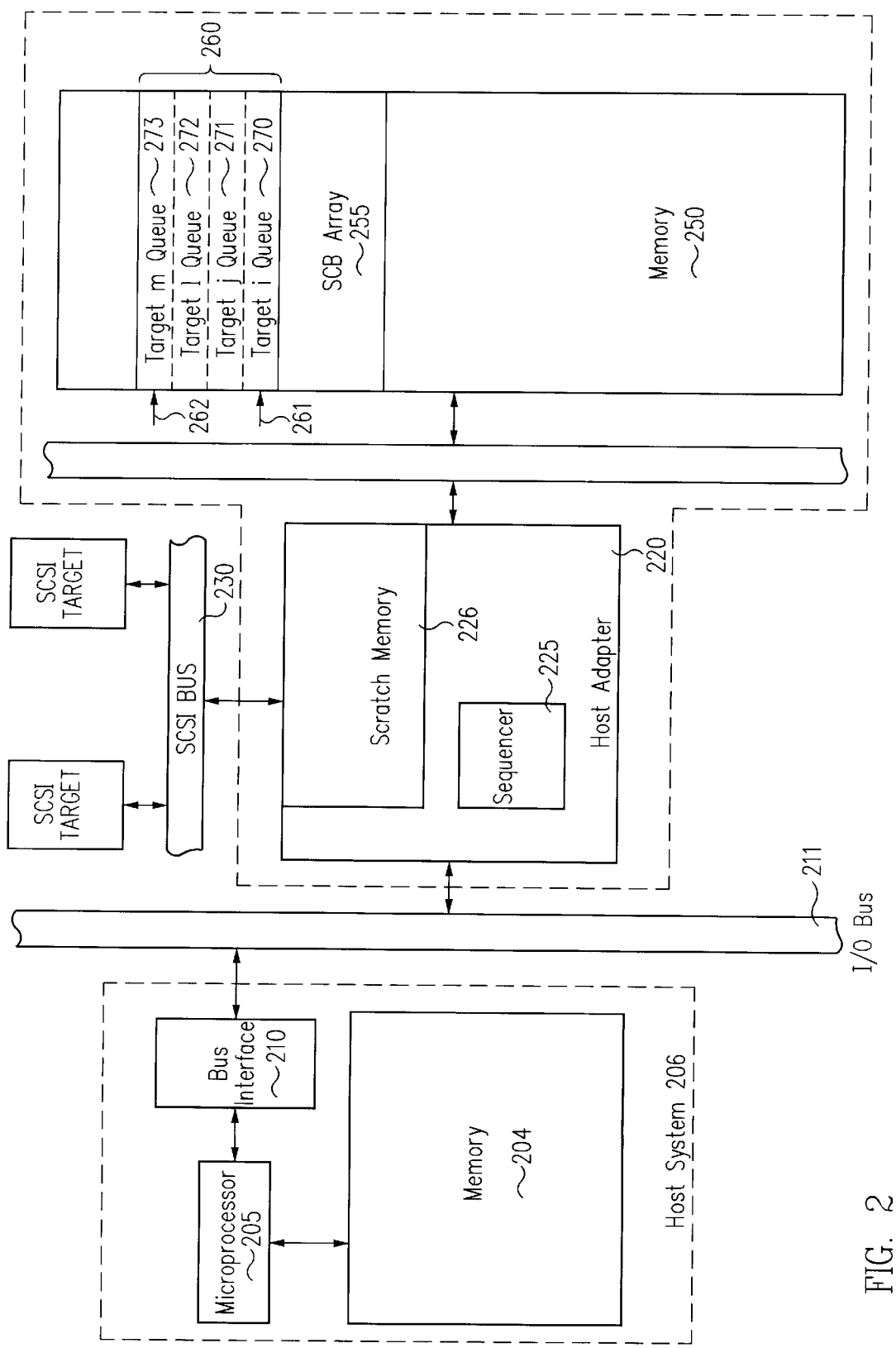
FIG. 2 is a block diagram of a host adapter system that includes the two-dimensional hardware command block execution queue of this invention.

According to the principles of this invention, a two-dimensional hardware control block queue 260 facilitates multiple hardware control block delivery to a single target device over an I/O bus 230, such as a SCSI bus. As explained more completely below, two-dimensional hardware control block queue 260 includes a plurality of target queues 270 to 273, where each target queue includes at least one hardware control block. Each of target queues 270 to 273 is a queue of hardware command blocks, e.g., SCSI control blocks (SCBs), for a specific target device on I/O bus 230.

When a selection is made by host adapter 220 for a target device based upon a hardware control block addressed by a head pointer 261, all hardware control blocks in target queue 270 within the two-dimensional hardware control block queue 260, which are accepted by the target device, are transferred to the target device. Those of skill in the art will appreciate that when it is stated that a hardware control block or a SCB is transferred to a target device, typically the complete block received from a host system 206 is not transferred. Rather, a portion of the hardware control block, sometimes referred to as a command, is transferred to the target device. Accordingly, herein transfer of a SCB or a hardware control block to a target device means transfer of only that portion of the block necessary to inform the target device of the operation or operations that the target device needs to perform.

If there are more hardware control blocks in target queue 270 than are accepted by the target device, target queue 270 is moved to the end of two-dimensional queue 260. Tail pointer 262 is changed to address the first hardware control block in target queue 270, and head pointer 261 is moved to address the first hardware control block in target queue 271.

Hence, unlike the prior art hardware control block queues that transferred a single hardware control block for each target selection, the two-dimensional hardware control block queue of this invention permits transfer of as many available hardware control blocks as can be accepted by the target device. This is particularly advantageous for Fibre Channel/ Arbitrated Loop for sending more than one command to a target for a single connection to that target. Similar performance enhancements are obtained for Packetized SCSI.

In one embodiment, two-dimensional queue 260 includes a common queue 275 (See FIG. 3B), e.g., SCB 05, SCB 167 and SCB 34 in SCB array 255,in a memory 250, and a plurality of target queues 270A to 272A. In this embodiment, SCB array 255 includes 256 storage locations, and a reference number of an SCB indicates the storage location within SCB array 255. Moreover, in one embodiment, memory 250 is internal to host adapter 220 and in another embodiment, memory 250 is external to host adapter 220.

A first SCB in common queue 275 of two-dimensional queue 260A, in this embodiment, is addressed by a common head pointer 341, which is this embodiment has a value of 05. Thus, common head pointer 341 addresses SCB 05 in SCB array 255. In this embodiment, common head pointer 341 is stored in scratch memory 226 of host adapter 220. A last SCB in common queue 275 is addressed by a common tail pointer 342, which in this embodiment has a value of 34. Thus, common tail pointer 342 addresses SCB 34 in SCB array 255.

Common queue 275 has one and only one SCB per target. Common queue 275 is a linked list of SCBs, i.e., a linked list in a first direction. In this embodiment, each SCB includes a next common queue site field CQNEXT, sometimes referred to herein as field CQNEXT, that contains a pointer to the next SCB in the common queue. Field CQNEXT in the last SCB in the common queue has an invalid pointer. This facilitates automated hardware in host adapter 220 determining when the end of common queue 275 is reached without having to access common tail pointer 342.

Figure 3A:
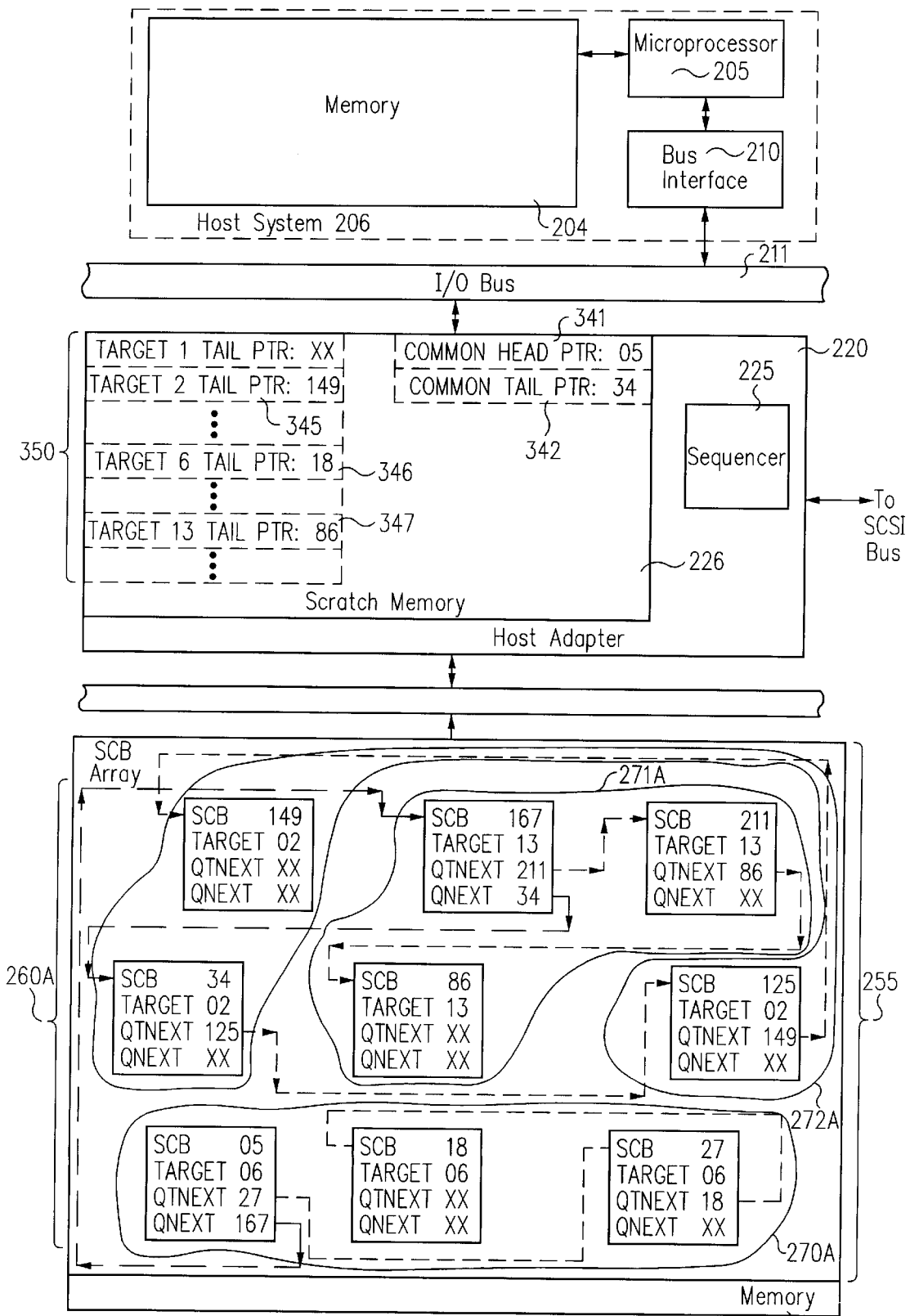
FIG. 3A is a block diagram of a host adapter system that includes one embodiment of the two-dimensional hardware command block execution queue of this invention.

Each target queue is a linked list of SCBs for one specific target, i.e., a linked list in a second direction. In the example of FIG. 3A, target queue 270A is for target 06; target queue 271A is for target 13; and target queue 272A is for target 2. Each of target queues 270A to 272A is a linked list that has its own target tail pointer, i.e., target tail pointer 345 for target queue 272A, target tail pointer 346 for target queue 270A, and target tail pointer 347 for target queue 271A. Hence, each target queue is delimited only by a target tail pointer. In memory 226, target tail pointers 345 to 347 are stored in contiguous list 350 in target number order, which in this embodiment is increasing target number order. Initially, each entry in list 350 is set to an invalid value. The value of a particular target ail pointer is assigned, as described more completely below.

In this embodiment, each SCB also includes a next target queue site field TQNEXT, sometimes referred to herein as field TQNEXT, which contains a pointer to the next SCB in the target queue. Field TQNEXT in the last SCB in the target queue has an invalid pointer. Again, this facilitates automated hardware in host adapter 220 determining when the end of the target queue is reached without having to access the target tail pointer. Notice that next common queue site field CQNEXT is not used except for SCBs in common queue 275.

A SCB is built in memory 204 by a device driver executing on processor 205, in a manner similar to that in the prior art. In particular, the device driver specifies the SCB storage location for the SCB in SCB array 255, and sets field CQNEXT and field TQNEXT to invalid values in one embodiment. Alternatively, these fields can be set by firmware executing on sequencer 225. The SCB is transferred from memory 204 to the specified storage location in SCB array 255. The particular process used to transfer the SCB from memory 204 to SCB array 255 is not essential to this invention.

When there is a new SCB in SCB array 255, firmware implementing append operation 400 (FIG. 4) and executing on sequencer 225 reads the target number from the SCB in read target number operation 401, and processing transfers to valid tail pointer check operation 402. In operation 402, the target number is used as index into list 350 of target tail pointers. If the target tail pointer at the indexed location in list 350 has an invalid value, processing transfers to read common tail pointer operation 405 and otherwise to update SCB operation 403.

If a valid target tail pointer exists for a target device, there is a target queue for that target in SCB array 255. Consequently, update SCB operation 403 accesses the SCB addressed by the target tail pointer read in operation 401. Update SCB operation 403 writes the location of the new SCB within SCB array 255 in field TQNEXT of the SCB addressed by the target tail pointer. Update SCB operation 403 transfers processing to update target tail pointer operation 404.

In update target tail pointer operation 404, the target tail pointer in list 350 that is indexed by the target number in the new SCB is changed to point at the storage location in SCB array 255 of the new SCB. Operation 404 transfers to done operation 410, because the new SCB has been appended to the appropriate target queue and consequently two-dimensional queue 260A.

If a valid tail pointer does not exist for a target device in list 350, there is not an SCB for the target device in common queue 275. Consequently, read common tail pointer operation 405 reads the common tail pointer in memory 204 to determine the storage location of the last SCB in common queue 275. Read common tail pointer operation 405 transfers processing to update SCB operation 406.

Update SCB operation 406 accesses the SCB addressed by common tail pointer. Update SCB operation 406 writes the location of the new SCB within SCB array 255 in field CQNEXT of the SCB addressed by common tail pointer. Update SCB operation 406 transfers processing to update target tail pointer operation 407.

In update target tail pointer operation 407, the target tail pointer in list 350 indexed by the target number is changed to point at the location in SCB array 255 of the new SCB. Operation 407 transfers update common tail pointer operation 408.

Figure 3B:
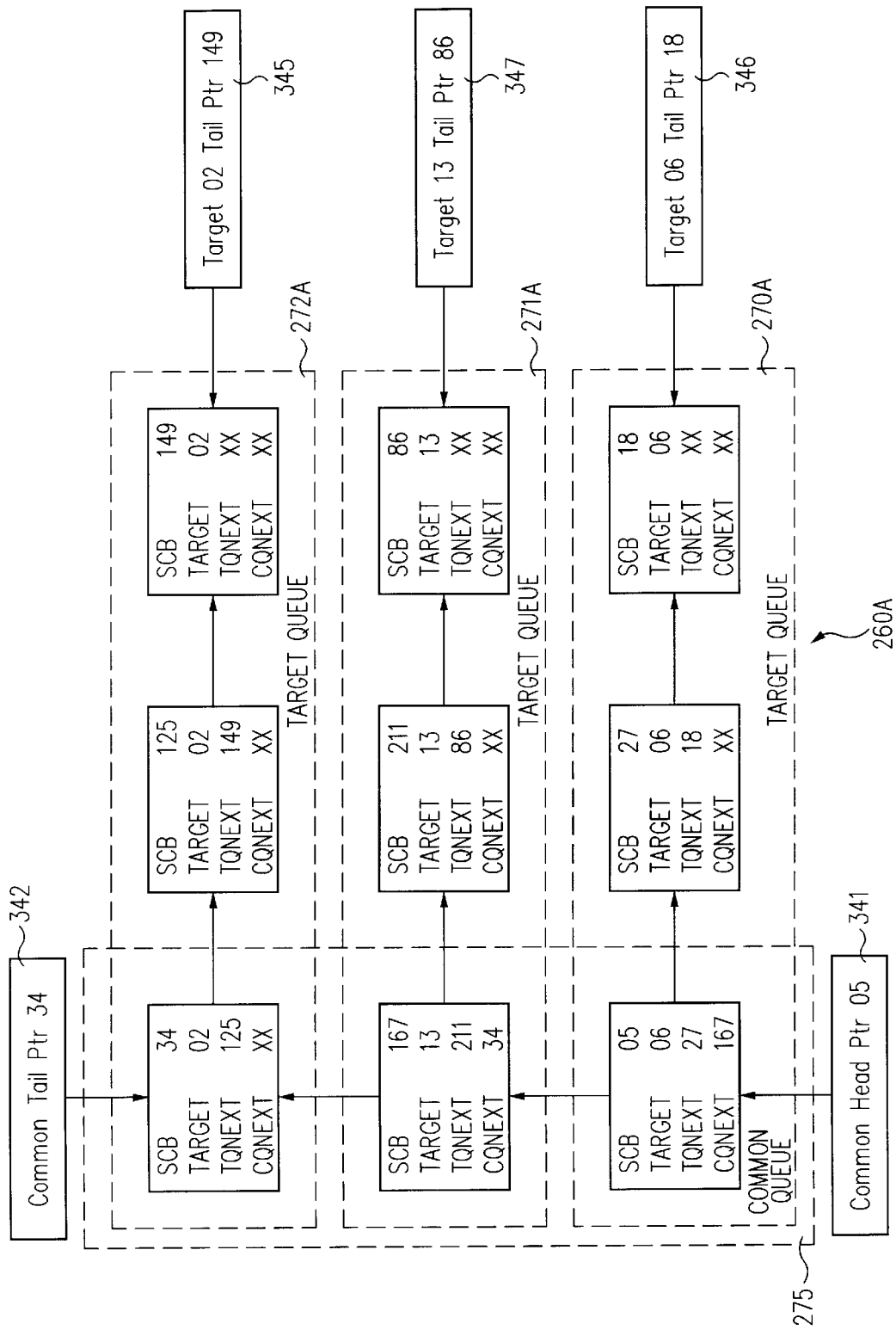
FIG. 3B is an illustration of only the two-dimensional hardware command block execution queue of FIG. 3A.

In update common tail pointer operation 408, common tail pointer 342 is changed to point at the location in SCB array 255 of the new SCB. Operation 408 transfers to done operation 410, because the new SCB has been appended to end of common queue 275, and a new target queue has been defined in two-dimensional queue 260A. Using method 400, SCBs are appended to the common and target queues in the order of arrival from host system 206. FIG. 3B is an alternative presentation of two-dimensional execution queue 260A that shows more clearly the two-dimensional nature of the queue built using method 400.

To transfer a SCB from two-dimensional target execution queue 260A to a target device, method 500 (FIG. 5) is used. In select target operation 501, host adapter 220 reads common queue head pointer 341, and then determines the target specified in the SCB at the head of two-dimensional target execution queue 260A, i.e., the SCB addressed by common queue head pointer 341. In the example of FIGS. 3A and 3B, common queue head pointer 341 addresses SCB 05, which specifies target 06. Consequently, host adapter 220 selects target 06 and transfers processing to transfer commands operation 502.

In transfer commands operation 502, host adapter 220 attempts to transfer the command blocks contained in all the SCBs in the target queue for the selected target. The particular procedure for transferring command blocks to a target is dependent on the protocol used, and the procedure is known to those of skill in the art.

For example, according to the Packetized SCSI protocol, all command information units sent to a target, except for the last, are preceded by a SPIL_Q packet with a Type field of Multiple Commands. The value in the Type field indicates to the target that another command is available for transfer. The last command information unit sent to the target is preceded by a SPIL_Q packet with a Type field of Command, which signals the target that the command information unit is the last to be transferred.

It is possible that the command blocks within all the SCBs in the target queue cannot be transferred to the target device following selection of the target device. For example, the target's command queue may be full when host adapter 220 has more SCBs in the target queue to transfer. The target device can signal host adapter 220 that the target device cannot accept further command blocks, for example, by changing the SCSI bus phase from phase Data Out to any other phase. Such a SCSI bus phase change prevents host adapter 220 from sending further command blocks in SCBs to the target device. Upon completion of the transfer, transfer commands operation 502 transfers to target queue empty check operation 503.

In target queue empty check operation 503, host adapter 220 determines whether all command blocks in the SCBs in the target queue were transferred to the selected target device, i.e., whether all the SCBs in the target queue were transferred. In the embodiment of FIGS. 3A and 3B, field TQNEXT is read in the last SCB transferred. If field TQNEXT in the last SCB transferred contains a valid pointer, SCBs remain in the target queue to be transferred and the target queue in two-dimensional target execution queue 260A is not empty. Conversely, if field TQNEXT contains an invalid pointer, all SCBs in the target queue were transferred, and the target queue in two-dimensional target execution queue 260A is empty.

The particular way used to determine whether the target queue is empty, e.g., whether all SCBs in the target queue were transferred to the target, is not essential to this invention. Multiple ways to make this determination are possible. For example, a count of the SCBs transferred and a count of the SCBs in the target queue could be compared. Alternatively, a last SCB transferred pointer could be compared with the tail pointer for the target queue. The important aspect is to determine whether upon completion of the transfer, SCBs remain in the target queue.

If the target queue is not empty, processing transfers from target queue empty check operation 503 to read pointer operation 504. In read pointer operation 504, host adapter 220 reads common tail pointer 342. With respect to method 500 and in general, reference to host adapter 220 taking an action refers to the action that results from firmware executing on sequencer 225. In the example of FIGS. 3A and 3B, common tail pointer 342 addresses SCB 34 that is at the end of common queue 275. Operation 504 transfers to update SCB operation 505.

Figure 3C:
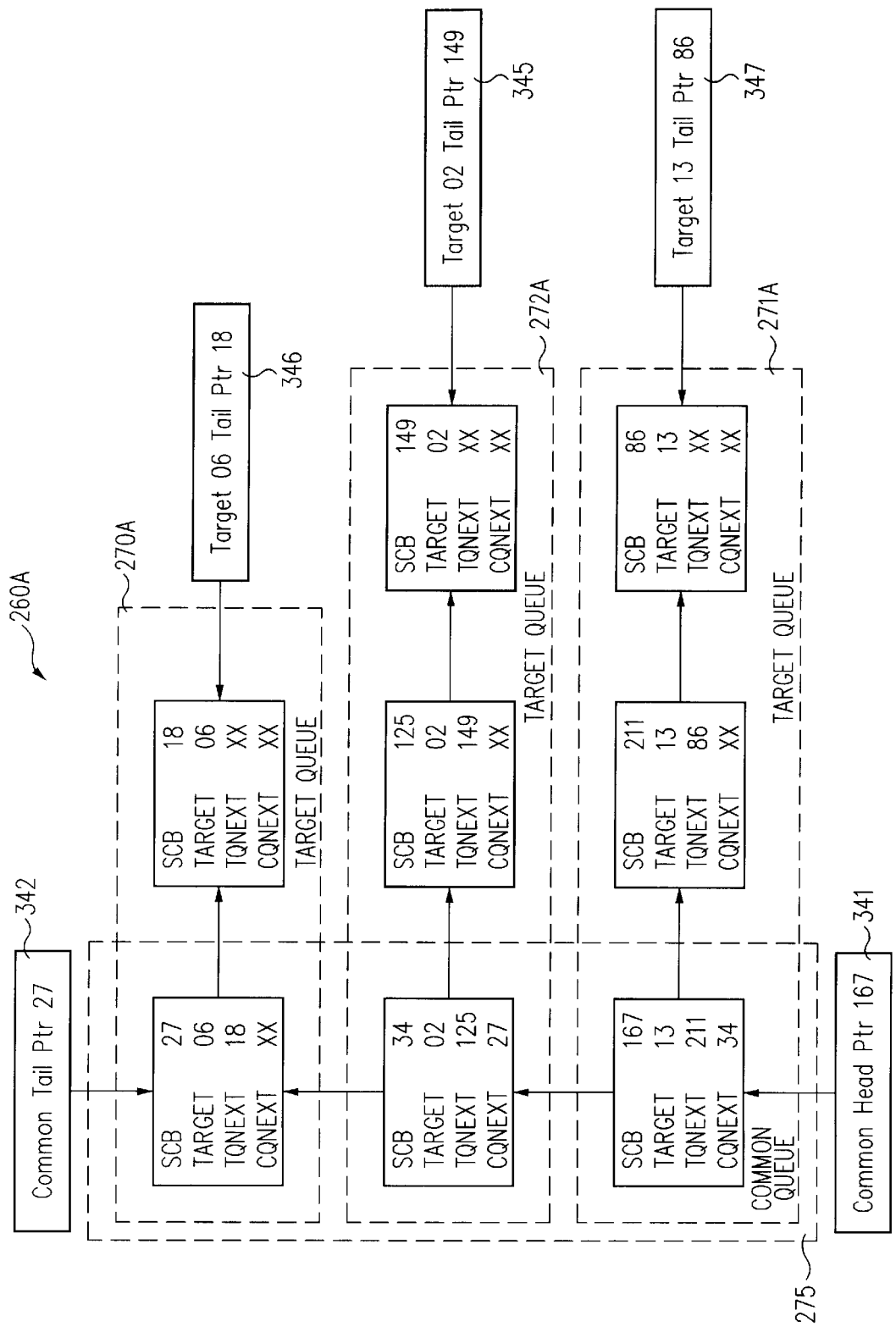
FIG. 3C is an illustration of the two-dimensional hardware command block execution queue of FIG. 3B after sending the common queue head hardware command block to a target device.

In update SCB operation 505, field CQNEXT in the SCB addressed by common tail pointer 342 is set to the value of the location in SCB array 255 of the first SCB remaining in the target queue. As an example, assume that only SCB 05 in target queue 270A was successfully transferred to target 06. In this case, the first SCB remaining in target queue 270A is SCB 27. (See FIG. 3C.) Thus, update SCB operation writes 27 to field CQNEXT in SCB 34 that is addressed by common tail pointer 341. Update SCB operation 505 transfers processing to update common tail pointer operation 506.

In update common tail pointer operation 506, common tail pointer 342 is changed to address SCB 27. Hence, the SCBs remaining in target queue 270A are appended to the end of common queue 275, and the SCBs for which commands were successfully transmitted to the target are removed from target queue 270A. Appending the remaining SCBs to the end of common queue 275 assures that all other targets are given an opportunity to receive commands before the first target is selected again for command transfer. Update common tail pointer operation 506 transfers processing to update common head pointer operation 511.

In update common head pointer operation 511, common head pointer 341 is changed to address the next SCB in common queue 275. In FIG. 3B, operation 511 reads field CQNEXT in SCB 05 and writes that value to common head pointer 341 so that common head pointer 341 addresses SCB 167 for target 13 (See FIG. 3C).

The above discussion assumed that upon completion of transfer commands operation 502, the target queue for the selected target was not empty and so check operation 503 transferred to operation 504. However, if the target queue is empty, check operation 503 transfers processing to update target tail pointer operation 510.

In update target tail pointer operation 510, the tail pointer for the selected target in list 350 is set to an invalid value to indicate that there is no target queue for that target in two-dimensional target execution queue 260A. Again, for FIGS. 3A and 3B, target 06 tail pointer 346 is set to an invalid value in list 350 in operation 510. This operation effectively removes the SCBs for target 06 from two-dimensional array 260A. Operation 510 also transfers to operation 511 that was described above and that description is incorporated herein by reference.

Hence, management of two-dimensional target execution queue 260A after command delivery for SCBs in a target queue is quite simple. If all commands specified in the target queue are transferred to the target, the target tail pointer is loaded with an invalid value. Conversely, when not all the commands are transferred to the target, the first remaining SCB in the target queue is appended to the tail of common queue 275. The linking of the remainder of the target queue and the target tail pointer for that queue remain unchanged. In either case, the common queue head pointer is advanced to the next SCB in common queue 275.

With the two-dimensional execution queue of this invention, queue manipulation is simple. SCBs are appended only to the tails of queues, and removed only from heads of queues. All commands for a target are highly available for maximum speed streaming to a target. No searching is required. In particular, wasteful searching across empty queues is not required. Priority of SCB execution is maintained according to the order of delivery by host system 206, although commands for the same target are grouped together. SCBs for which a target cannot accept commands are given lowest priority by appending the SCBs to the end of the two-dimensional execution queue. Only tail pointers are required for the second dimension of queuing.

Figure 6:
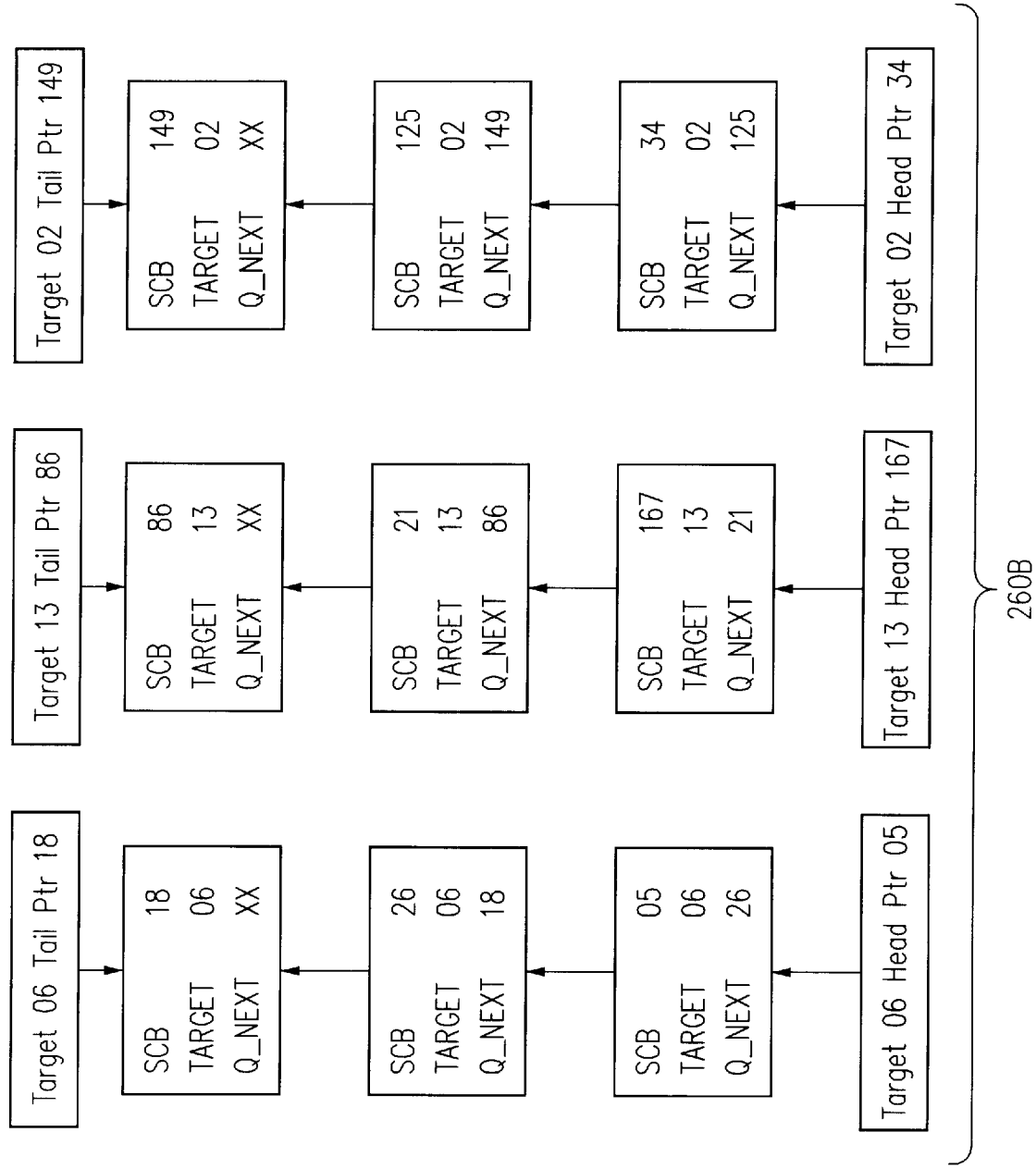
FIG. 6 is an illustration of another embodiment of the two-dimensional hardware command block execution queue of this invention.

Other alternative embodiments of the two-dimensional execution queue of this invention are possible. For example, FIG. 6 illustrates another embodiment of two-dimensional execution queue 260B that utilizes the prior art SCBs as described above with a field Q_NEXT. In this example, each target device has a target queue that is delimited by a head pointer and a tail pointer. The target queue is a linked list of SCBs in array 255 for that target device. Space for the pointers for each target queue is allocated even if the target queue is empty.

To select a particular target queue, host adapter firmware must locate the target queues with SCBs ready for execution. In one embodiment, the firmware scans all the target queues using a round-robin or priority starting point, and selects the target corresponding to the first non-empty target queue found. All SCBs for that target are readily located and easily removed from the target queue, because the SCBs are removed from a head of a queue and not somewhere in the middle of a queue. Typically, a host adapter selects targets in the same order as the arrival of SCBs for the targets from the host. This embodiment of the two-dimensional execution queue selects targets in the order of the queue polling scheme.

If the target order from the host is of importance and it is desirable to use two-dimensional execution queue 260B, an additional first in first out queue of target numbers where the target numbers are placed in this queue in order of receipt from the host could be utilized. If the queue for a particular target is not empty, the target number is not added to the first in first out queue of target numbers. The target number at the output of the target number queue is used as an index into the target queue head pointer list and to select a target. If not all the SCBs for the selected target were transferred, the target number is placed at the input of the queue of target numbers. This eliminates the need to poll, or use the round robin scanning, but requires additional storage and firmware to manage the additional queue of target numbers.

In this embodiment, new SCBs are appended to a queue using a method similar to method 400 described above.

Although particular embodiments of the present invention have been shown and described, it will be apparent to those skilled in the art that changes and modifications may be made without departing from the present invention in its broader aspects. Therefore, the embodiments described herein are illustrative only and are not intended to limit the invention to the specific embodiments described.

I claim:

1. In a memory, a command block execution queue comprising:
    a plurality of command blocks in a first linked list;
    another plurality of command blocks in a second linked list, where only one of said another plurality of command blocks is included in said plurality of command blocks in said first linked list; and
    a tail pointer to a tail command block in said second linked list wherein said tail pointer is an only delimiter for said second linked list.

2. The command block execution queue as in claim 1 further comprising:
    a head pointer to a head command block in said first linked list.

3. The command block execution queue as in claim 2 further comprising:
    a tail pointer to a tail command block in said first linked list.

4. A command block execution queue comprising:
    a common linked list of command blocks having a common head command block and a common tail command block;
    a head pointer to said common head command block;
    a tail pointer to said common tail command block;
    a target linked list of command blocks having a target head command block and a target tail command block wherein only said target head command block is included in said common linked list of command blocks; and
    a tail pointer to said target tail command block wherein said tail pointer to said target tail command block is an only delimiter of said target linked list of command blocks.

5. The command block execution queue of claim 4 wherein each command block includes a command for a target device, and further wherein said common linked list contains a maximum of one command block for a target.

6. The command block execution queue of claim 5 wherein said target linked list contains only command blocks for a single target device.

7. The command block execution queue of claim 4 further comprising:
    another target linked list of command blocks having another target head command block and another target tail command block wherein only said another target head command block is included in said common linked list of command blocks.

8. The command block execution queue of claim 7 further comprising:
    another tail pointer to said another target tail command block.

9. The command block execution queue of claim 8 wherein said tail pointer and said another tail pointer are included in a list of tail pointers.

10. A command block execution queue comprising:
    a common linked list of command blocks having a common head command block and a common tail command block;
    a head pointer to said common head command block;
    a tail pointer to said common tail command block;
    a target linked list of command blocks having a target head command block and a target tail command block wherein only said target head command block is included in said common linked list of command blocks;
    a tail pointer to said target tail command block;
    another target linked list of command blocks having another target head command block and another target tail command block wherein only said another target head command block is included in said common linked list of command blocks; and
    another tail pointer to said another target tail command block,
    wherein said tail pointer and said another tail pointer are included in a list of tail pointers; and
    each command block includes a command for a target device having an identification number and further wherein said target linked list contains only command blocks for a single target device having a first identification number, and said another target linked list contains only command blocks for another single target device having a second identification number.

11. The command block execution queue of claim 10 wherein said tail pointer is stored in said list of tail pointers at a location determined by said first identification number.

12. The command block execution queue of claim 10 wherein said another tail pointer is stored in said list of tail pointers at a location determined by said second identification number.

13. A method of managing command block execution queue where each command block is associated with one of a plurality of target devices, the method comprising:
    testing a predefined location in a list of target tail pointers to determine whether a target queue exists for a target device specified in a hardware command block;
    appending said hardware command block to a tail of the target queue for said target device upon said testing indicating that the target queue exists; and
    appending said hardware command block to a tail of a common queue upon said testing indicating that the target queue does not exist.

14. A method of managing command block execution queue where each command block is associated with one of a plurality of target devices, the method comprising:
    appending a new command block to a common tail command block of a common linked list of command blocks when said new command block is associated with a target device different from the target devices associated with the command blocks included in said common linked list of command blocks; and appending said new command block to a target tail command block of a target linked list of command blocks when said new command block is associated with a target device which is a same target device as that associated with one of the command blocks included in said common linked list of command blocks wherein only one target command block of said target linked list is included in said common linked list of command blocks.

* * * * *